(12) United States Patent
Preston

(10) Patent No.: US 6,801,474 B2
(45) Date of Patent: Oct. 5, 2004

(54) RESAMPLING SONAR ECHO TIME SERIES PRIMARILY FOR SEABED SEDIMENT CLASSIFICATION

(75) Inventor: Jonathan M. Preston, Victoria (CA)

(73) Assignee: Quester Tangent Corporation, Victoria (CA)

( * ) Notice: Subject to any disclaimer, the term of this patent is extended or adjusted under 35 U.S.C. 154(b) by 0 days.

(21) Appl. No.: 10/449,914

(22) Filed: May 30, 2003

(65) Prior Publication Data

US 2004/0027918 A1 Feb. 12, 2004

Related U.S. Application Data

(60) Provisional application No. 60/385,101, filed on May 31, 2002.

(51) Int. Cl.[7] .............................................. G01S 15/00
(52) U.S. Cl. .......................................... 367/97; 367/88
(58) Field of Search ............................. 367/88, 95, 97, 367/15, 21, 23

(56) References Cited

U.S. PATENT DOCUMENTS 5,142,502 A * 8/1992 Wilcox et al. ................. 367/88

FOREIGN PATENT DOCUMENTS

WO       WO03102624    * 12/2003    ........... G01S/15/89

OTHER PUBLICATIONS

Babovic; Seabed Recognition Using Neural Networks; Mar. 1999, p. 12.*
J.V. Watt, "Seabed Classification—A New Layer for Marine GIS", Quester Tangent Corporation, Sidney, BC, Canada, believed to be published Sep. 1, 1998.

W.T. Collins & K.P. Rhynas, "Acoustic Seabed Classification using Echo Sounders: Operational Considerations and Strategies", Canadian Hydrographic Conference, Victoria, British Columbia, Canada, 1998.

B.T. Prager, D.A. Caughey & R.H. Poeckert, "Bottom Classification: Operational Results from QTC View", IEEE Oceans '95 Conference, San Diego, CA, USA, Oct. 1995.

B. Prager, R. Inkster, P. Lacroix & L. Mayer, "ISAH–S Bottom Classification—Preliminary Results", IEEE Oceans '93 Conference, Victoria, British Columbia, Canada, Oct. 1993.

T. Varghese & J. Ophir, "Enhancement of echo–signal correlation in elastography using temporal stretching", IEEE Trans. Ultrason, Ferroelect, Freq Contr. vol. 44, No. 1, pp. 173–180, 1997.

D. Sternlicht, "High Frequency Acoustic Remote Sensing of Seafloor Characteristics", Dissertation submitted in 1999 at the University of San Diego.

* cited by examiner

*Primary Examiner*—Daniel Pihulic
(74) *Attorney, Agent, or Firm*—Brinks Hofer Gilson & Lione

(57) ABSTRACT

This invention describes a method and system for classifying a survey area according to an attribute of the seabed. More particularly, the classification technique uses echoes recorded from sonar pings transmitted towards the seabed. The echoes are resampled at a sampling frequency which takes into account the depth of the water, sediment conditions generally in the area and the duration of the ping, resulting in an improved classification of the seabed according to the selected attribute.

18 Claims, 5 Drawing Sheets

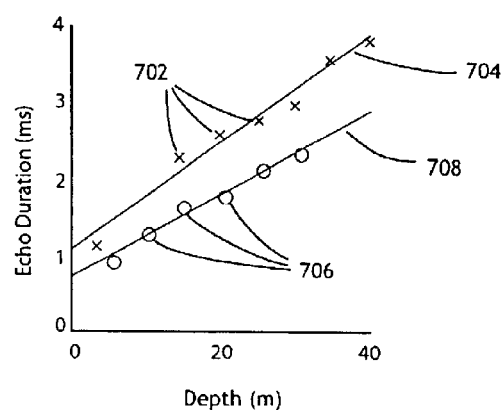
Figure 7A
Figure 7B
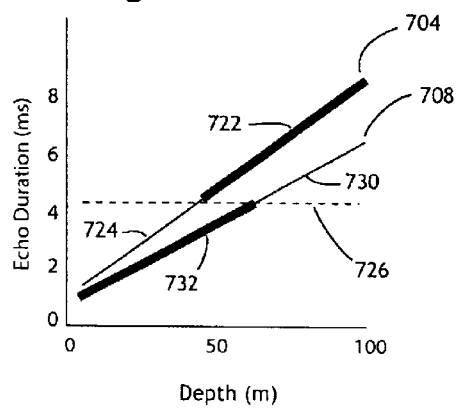
Figure 7C
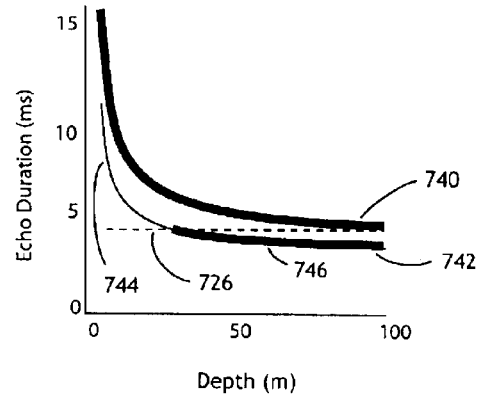
Figure 7D
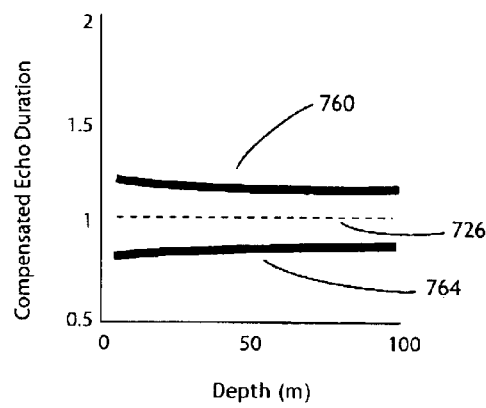

RESAMPLING SONAR ECHO TIME SERIES PRIMARILY FOR SEABED SEDIMENT CLASSIFICATION

CROSS REFERENCE TO RELATED APPLICATION

This application claims the benefit of U.S. provisional application No. 60/385,101 filed May 31, 2002, the entirety of which is incorporated herein by reference.

FIELD OF THE INVENTION

This invention relates generally to the transformation of the echoes of sonar pings which have been transmitted towards and scattered back from the seabed, so as to improve the classification of sediments on or other attributes of the seabed. In particular, this invention describes a method for sampling the echoes so as to remove the effects of water depth on echo duration, thereby enabling an improved classification of sediments of the seabed.

BACKGROUND OF THE INVENTION

Echo sounders have been used since before World War II to determine the depth of water by measuring the time it takes a sound pulse to travel to and return from the seabed. In a similar fashion, underwater objects such as mines and submarines have been successfully detected by listening for the echoes received in response to pings transmitted by a sounder. During World War 11 the name sonar (analogous to radar) was given to this technology. Further successful uses of sounder technology have included locating fish, measuring the thickness of ice in Arctic regions and oceanographic charting. Echo sounders can also be used to estimate the nature of sediments on the seabed by examining the shape and duration of the echoes of pings returning from the seabed.

The sounders in use today frequently use materials such as piezoelectric crystals (for example, quartz or tourmaline), magnetostrictive materials (for example, iron or nickel), or electrostrictive crystals (such as barium titanate) which change shape under electric or magnetic fields. Such materials can be used both to generate sound pulses ("pings") by applying an oscillating electric or magnetic field of suitable frequency and to generate electric signals in response to sound energy received. Generally, the pings transmitted are short in duration (less than 1 ms). Each ping is a bundle of sound waves at a frequency typically between 5 kHz and 300 kHz.

The determination of the sedimentary characteristics of the seabed from data supplied by an echo sounder is generally described in "Seabed Classification—A New Layer for the Marine GIS" (J. V. Watt, Quester Tangent Corporation, Sidney, British Columbia, Canada) and in "Acoustic Seabed Classification using Echo Sounders: Operational Considerations and Strategies" a paper presented by William T. Collins and Karl P. Rhynas at the Canadian Hydrographic Conference, Victoria, British Columbia, Canada, 1998. Briefly:

(1) A vessel carrying an echo sounder travels over an area of the seabed. At points along the vessel's path, a ping is transmitted from the echo sounder towards the seabed. Each ping advances spherically from the vessel beneath the surface of the ocean. The ping's wavefront continues spreading until it strikes the seabed below the vessel. At that point, the ping insonifies a small area of the seabed and some of the sound is scattered back towards the surface. As the wavefront continues to advance, it spreads out over a circular (or possibly elliptical or annular) area of the seabed as well as down into sediments covering the seabed, causing further scattering of sound energy back towards the surface.

(2) A detector receives energy scattered back from the seabed. Usually, the detector measures the energy received over a narrow solid angle (less than 10 degrees) which, typically, is cone-shaped. The area on the seabed within the detector's field of view is known as the ping's "footprint".

(3) The detector samples the analog signal at rates up to 5 MHz, but usually more slowly, and records amplitude values for each ping as a time series. Each time series is typically made up as follows:

(a) An initial peak caused by reflection of the ping from the apparatus of the sounder itself or from bubbles close to the sounder;

(b) An almost silent period corresponding to the round-trip passage of the ping from the sounder to the seabed (the "pre-echo"). During the pre-echo, the amplitude of the signal received by the detector is only background noise.

(c) The echo of the ping.
The starting point of the echo in the time series begins at a time corresponding to the first arrival of sound at the detector after it has been scattered back by that part of the footprint closest to the detector. The echo continues for a period of time corresponding to the wavefront's passage over the footprint and into the seabed sediments, after which time it dies out gradually and the signal returns to background noise.

(d) A second silent period occurring after the echo has died out completely and before the transmission of the next ping (the "post-echo").

(4) The number of samples in the initial peak and the pre-echo portions of the time series represent the travel time of the ping to the seabed and back. From this number and the speed of sound in water, the depth to the seabed is calculated. The leading values are then removed by a technique known as "bottom picking". The resulting time series contains the echo of the ping and the post-echo (the "ping time series").

(5) In addition to the values of depth and the ping time series itself, data are recorded for each ping describing the geographical position and the orientation of the vessel at the time of transmission. These additional data make it possible to associate each ping with a unique survey point on the seabed.

The character of the seabed is estimated by comparing the shape and duration of the echo portion of the ping time series associated with each of the survey points within the survey area. The techniques used are statistical in nature and rely on the calculation of a number of measures ("features") from each ping time series. Many of the features so calculated make use of the duration of the echo. However, the duration of a ping's echo is affected by the depth and this effect must be removed before valid comparisons can be made.

Conventional techniques to adjust for depth assume that the duration of the echo is proportional to the depth and such echoes are scaled appropriately to compensate for that effect. However, the adjustment of echo duration according to depth is an approximation which only holds well in deep water where the lengthening of the echo is primarily due to larger size of the footprint on the seabed. In shallow water, there is much less spreading and the duration of the ping itself and the penetration of the ping into the seabed sediment are very often the dominant factors. Failure to properly account for these effects introduces artifacts into the data that appear subsequently in the classification as patterns of incorrectly classified sediments.

SUMMARY OF THE INVENTION

The subject of this invention is a method and apparatus for classifying a survey area according to an attribute of the seabed.

More particularly, the classification uses echoes recorded from sonar pings transmitted towards the seabed to calculate a feature vector (typically having more than 100 elements) of statistical measures at survey points along the course of a survey vessel. The feature vectors are used to calculate a smaller number (typically 3) of principal components. The application of the principal components to the feature vector at a survey point produces a Q-vector having as many elements as principal components used. The Q-vectors at each survey point are used in a cluster analysis to optimally assign survey points to clusters. In a final step the clusters are interpreted according to the direct observation of an attribute (such as sediment type, weed cover or roughness) of the seabed at a small number of selected survey points.

The echoes received from deeper depths are usually longer than those from shorter depths. This affects the values of the features calculated and subsequently the classification made. An adjustment must be made so that echoes from different depths which are scattered back from similar conditions on the seabed produce similar feature vectors. The invention described herein provides a method for resampling echoes at a sampling frequency which takes into account the depth of the water, sediment conditions generally in the area and the duration of the ping, resulting in an improved classification of the seabed according to the selected attribute.

The steps for the collection of the echo data, the removal of any erroneous values, the detection of the beginning of the echo, the calculation of the feature vectors after resampling and the classification of survey points from the feature vectors are all conventional. The inventive step lies in the technique used to adjust the duration of the echoes by resampling.

In a further embodiment of the invention, a system to implement the steps of the inventive method is described and claimed.

Other features and advantages of the invention will become apparent from the detailed description and the claims that follow.

BRIEF DESCRIPTION OF THE DRAWINGS

FIG. 7A shows a graph of the observed results of echo duration measured at different depths to the seabed for gravel and mud sediments.

FIG. 7B shows the classification by an exemplary scheme of the observations of FIG. 7A without echo duration adjustment.

FIG. 7C shows the classification by an exemplary scheme of the observations of FIG. 7A with echo duration adjustment proportional only to depth.

FIG. 7D shows the classification by an exemplary scheme of the observations of FIG. 7A with the echo duration adjustment technique described in the invention.

DETAILED DESCRIPTION

The classification of the seabed in the preferred embodiment of the invention uses data recorded from the echoes of sonar pings by detectors mounted on vessels or tow-fish as they track over the seabed. The echoes of the pings received correspond to sound energy backscattered from the seabed as measured over a narrow solid angle directed at close to normal on the seabed.

Figure 1:
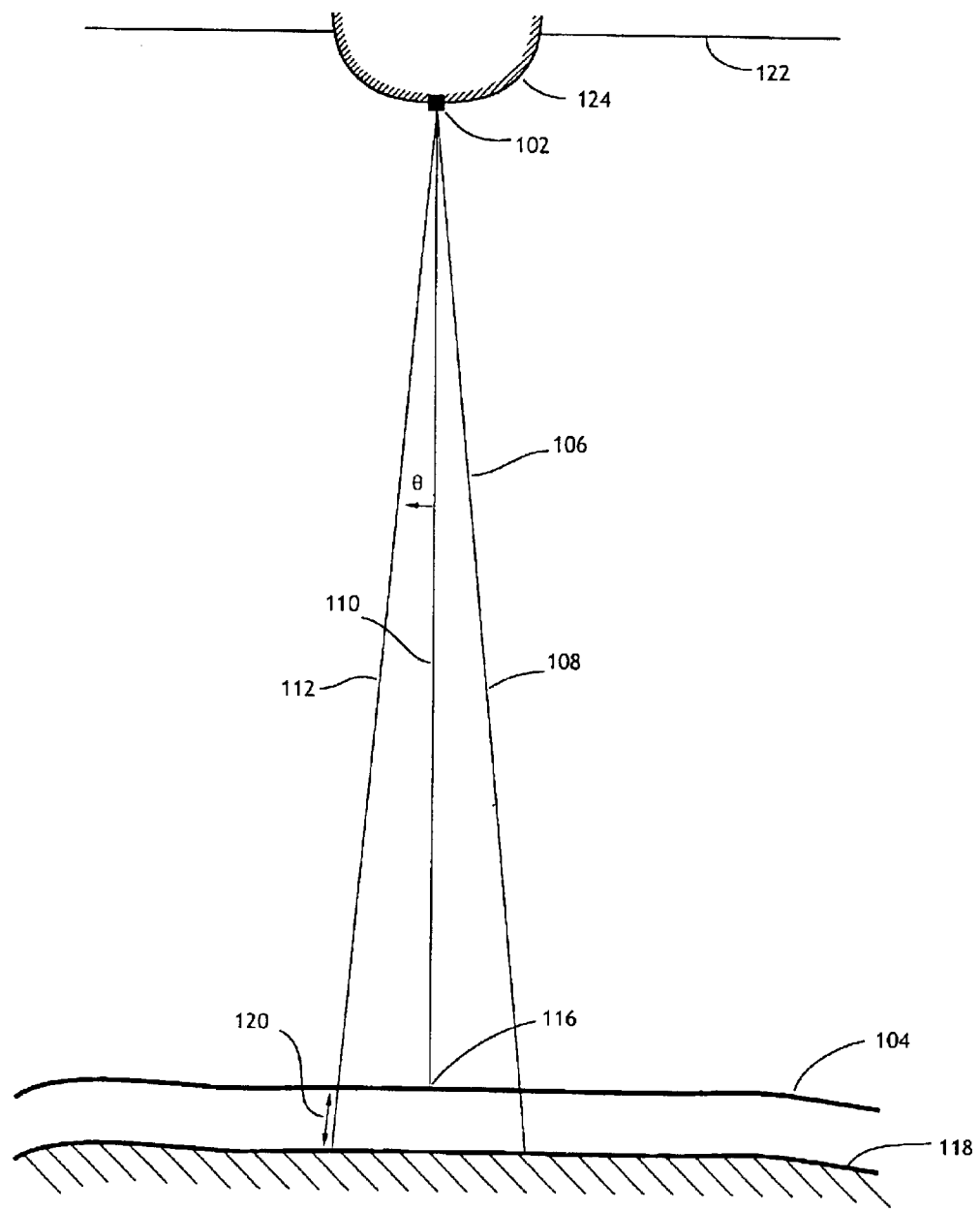
FIG. 1 shows a schematic drawing of a transverse section of a vessel transmitting a ping to the seabed.

FIG. 1 shows schematically the geometry of the transmission and detection of a ping from an echo sounder 102 directed towards the seabed 104. The echo sounder 102 transmits a ping at a known frequency for a pulse lasting a known and consistent length of time. The sound waves generated are compression waves and they propagate out from the echo sounder spherically toward the seabed. A fraction of the energy that reaches the seabed 104 is scattered back to the sounder 102, where it is detected as an echo by a detector (not separately shown) in the sounder 102. The vessel 124 carrying the echo sounder is assumed to be moving into the plane of the figure. The ocean surface is shown as 122. The detection of backscattered sound takes place over a narrow cone shape 106, the detection cone, of which a cross-section athwartships is shown in FIG. 1. The width of the detection cone 106, both transverse and along the course of the vessel, is determined by the physical structure of the sounder 102. The greatest angular extent of the detection cone 106 to starboard is shown as 108 and the greatest angular extent of the detection cone 106 to port is shown as 112.

The line normal to the seabed that bisects the detection cone 106 is shown as 110. The half angle at the apex of the detection cone is shown as $\theta$. As the ping 106 advances to the seabed 104, it first strikes the seabed 104 where the normal 110 meets the seabed 104 at the point 116. The first sound detected in the backscattered echo is received from this point 116 after traversing in all a distance of twice the distance between the sounder 102 and the point 116. The wavefront of the ping, once it reaches the point 116, continues spreading both out across the surface of the seabed 104 and down into the sediments that overlay the hard substructure 118. The detected echo continues as the wavefront spreads out, including energy scattered back from both the seabed surface 104 and from the insonified sediments lying thereunder (between 104 and 118). The echo signal received continues for a period corresponding to twice the path at the extreme of the detection cone 106, either 108 or 112, whichever is the longer, and for twice the distance 120 into the sediments overlaying the substructure 118.

The signal generated by the detector is initially an analog signal of the amplitude of the received echo. For sediment classification, this is usually digitized to produce a time series of amplitude values. The number of values recorded per ping depends on the round-trip time for the ping and the sampling rate. In deeper water (for example, 150 m), the round-trip time is approximately ⅕ s. (The velocity of sound in sea water is approximately 1500 m/s at average temperatures and salinity.) At a sampling rate of 100 kHz, the time series for a ping with a ⅕ second round-trip would include approximately 20,000 amplitude values. Of these, perhaps a few hundred amplitude values would represent the echo of the ping itself. Although this number is not large it is usually sufficient for sediment classification purposes. However, in shallow water (for example, 1.5 m), the round trip time is much shorter, approximately 2 ms, and the ping's pulse may only last for 0.2 ms. Again, if the sampling rate is 100 kHz, the entire 2 ms round trip for the ping would produce 200 samples and the echo itself would only occupy 20 samples, insufficient for accurate classification. Typically therefore, in shallow water, a higher sampling rate is used (up to 5 MHz) so that greater detail can be captured.

Figure 2A:
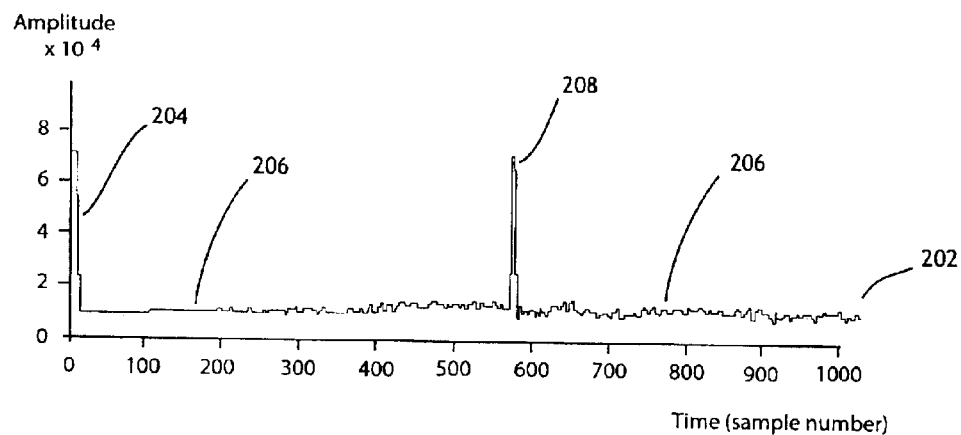
FIG. 2A shows a graph of the amplitude of the signal detected after the transmission of a ping.

FIG. 2A shows a portion of a typical signal 202 recorded as the sampled output of the echo sounder's detector. The graph of FIG. 2A is confined to a period of time beginning with the transmission of a ping and ending when the next ping is transmitted. The amplitude of the signal received is plotted along the ordinate of the graph of FIG. 2A in arbitrary units, scaled so that the largest value fits in a convenient range. The points in time at which the received signal have been sampled (as determined by the sampling frequency) are plotted along the abscissa of the graph. (Due to the limited resolution possible in the drawing, only a representative selection of points is displayed.) Commonly the detector picks up some of the energy of the originating ping and this is shown as a peak 204 during a very brief period at the beginning of the signal. For a period of time during which the wave propagates to and is scattered back from the seabed, the received signal 202 is essentially flat (signal portions 206) and represents background noise. During an interval of time at least as long as the originating ping, the ping's echo 208 is received backscattered from the seabed. After the echo 208 dies out, the signal 202 returns to its earlier background level 206. Occasionally, one or more other smaller spikes (not shown) may appear after the main echo 208. These smaller spikes are, for example, caused by a wave travelling to the seabed, being reflected back to the water surface, and then being reflected back for a second trip to the seabed. Such additional spikes are always of much reduced amplitude relative to the main echo spike 208. In summary, the result of the detection for one ping is a time series of amplitude values, scaled in arbitrary units.

Figure 2B:
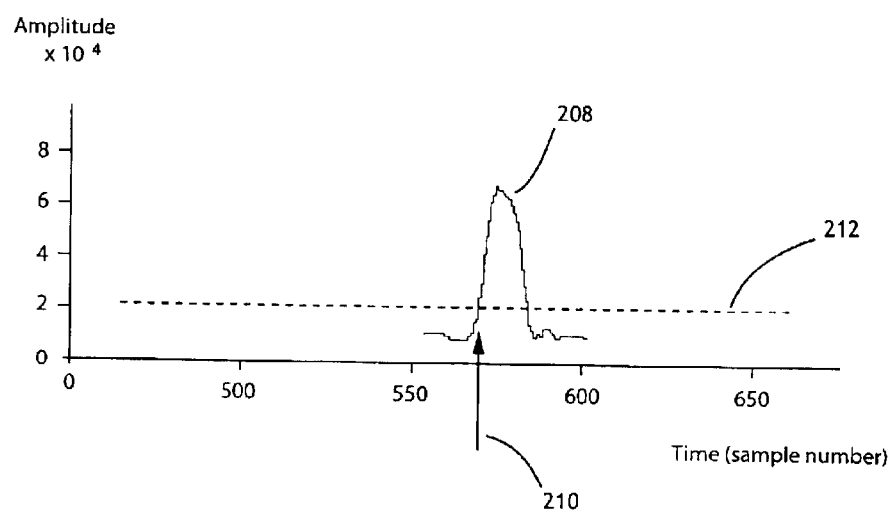
FIG. 2B shows an enlargement of the echo region of the signal of FIG. 2A.

Each time series has values recorded during the pre-echo that can be removed to reduce the size of the survey dataset. The beginning of the echo is determined by one of a number of conventional bottom picking techniques. Values preceding the beginning of the echo are removed and a record is kept separately of the corresponding duration to the beginning of the echo. For example, FIG. 2B shows the echo spike 208 magnified along the time axis and a dashed line 212 corresponding to 25 percent of the peak amplitude recorded. Values of the amplitude leading up to the echo are examined until the first value 210 is found whose amplitude exceeds the 25 percent level 212. Sample values beginning typically more than 5 sample values prior to the value 210 are removed. The resulting set of values is referred to as a ping time series The signals from successive pings often vary considerably and it is usually advantageous to stack together groups of adjacent ping time series by summing their amplitude values. This has the effect of smoothing out the data, reducing the likelihood of large, sudden changes in the amplitudes of echoes recorded. For example, if a vessel is travelling at 4 m/s and pings are sent twice per second, each time series recorded represents information from survey points separated by approximately 2 m on the seabed. For the purposes of seabed classification, groups of 5 time series can be summed together, aligned by their bottom picks. The depth for this stacked ping time series is calculated as the average of the depths for the individual time series in each group.

The character of the seabed is estimated using statistical techniques which rely on the computation of measures ("features") derived from the amplitude values recorded during the echo portion of each ping time series. Many of the features calculated are sensitive to the duration of the echo. However, calculating the values for features from the actual observed durations of the echoes can lead to invalid classification of the character of the seabed. For example, if pings from two survey points at different depths produce time series with echoes of identical shape and duration, then the features calculated from these echoes will be identical. However, to conclude that both survey points had the same sediment type would likely be incorrect as the duration of the echo varies with the depth to the survey point. In order to avoid this problem, the echo portion of each ping time series is resampled so that the duration of the echo portion of each ping time series does not depend on the depth.

In the preferred embodiment of the invention, each stacked ping time series is resampled at a frequency chosen for the associated depth. The frequency is selected so that a "standard echo", computed from a theoretical model, will have 100 values significantly different from zero. Echoes, at the same depth, resampled at the same frequency, which produce more than 100 significant values presumably do so because of greater penetration into the sediment or because the surface is rough or sloped; similarly, echoes at the same depth producing fewer than 100 significant values presumably do so as a result of a harder surface or a shallower sediment layer at the survey point. In each case, the resampling is done for 256 points to reduce the likelihood of cutting off any particularly long echoes.

With reference to FIG. 1, if:

c is the speed of sound in seawater (meters/second);

d is the depth of the water 110 (meters);

$\theta$ is the half-angle of the detection cone;

$\tau$ is the duration of the pulse (seconds);

p is a characteristic distance for the penetration into the local sediment type 120 (meters).

then the duration of the standard echo L in seconds is given by the difference between the longest and shortest paths travelled:

$$L = [(2 \times d/c) \times (\sec \theta - 1)] + (2 \times p/c) + \tau$$

This assumes that:

the ping travels through water of depth d to a flat bottom;

is detected by a detector having an aperture of $2\theta$;

the sounder has transmitted for $\tau$ seconds; and the ping travels through sediment of thickness p before being scattered back.

Figure 3:
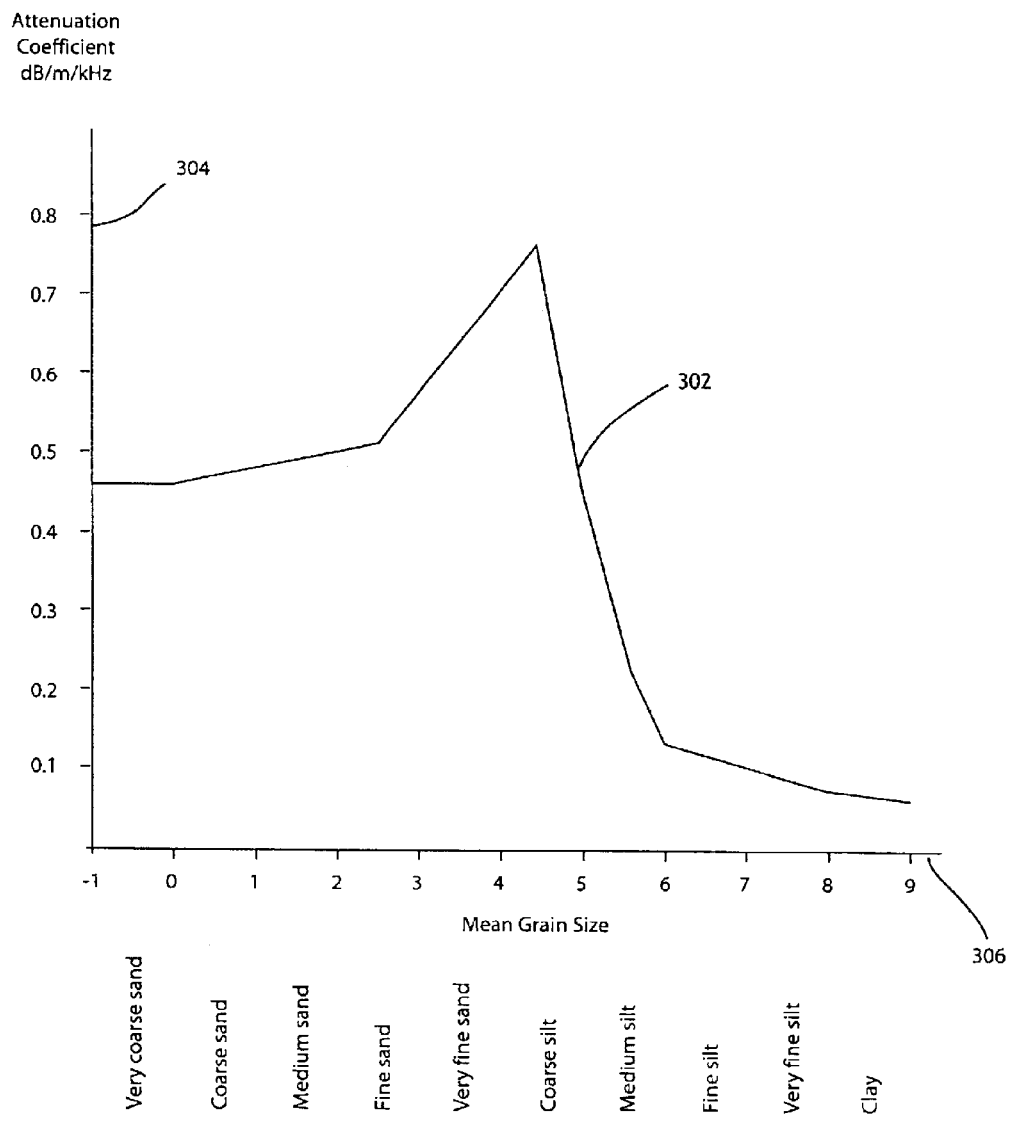
FIG. 3 shows a graph of the attenuation coefficient of sound waves through different types of sediment.

In order to make an estimate of the penetration into the seabed, it is assumed that this occurs when there is a 20 dB drop between the amplitude of the wavefront exiting and entering the sediment, corresponding to a distance 2p, the factor 2 accounting for the two-way travel. Thus, having a general appreciation for the nature of the sediment in the area, a value for the attenuation coefficient k can be selected and the penetration depth p is calculated as:

$$p = A/(2 \times k \times f)$$

where:
- A is a selected attenuation of the power of the ping's wavefront between its entry into and its exit from the sediment (dB).
- k is the attenuation coefficient for the penetration into the local sediment type (in dB/m/kHz)
- f is the frequency of the sound waves in the ping's pulse (in kHz);

Some results of research into the attenuation of sound by gravels and silts is shown in FIG. 3. This is based on work described in "High Frequency Acoustic Remote Sensing of Seafloor Characteristics" the Ph.D. thesis of D. Sternlicht, Scripps Institute of Oceanography, University of California, San Diego (presented in 1999). The line shown in the graph 302 relates the attenuation coefficient quoted in dB/m/kHz on the vertical axis 304 to the mean grain size on the horizontal axis 306. Coefficients typically range from about 0.7 to 0.05 dB/m/kHz for grain sizes from very coarse sand to clay.

Although the resampling is effective with many values for the parameter A, direct shows 20 dB to be a suitable value for A. This produces an on as:

$$L = [(2 \times d/c) \times (sec\ \theta - 1)] + (20/(c \times k \times f)) + \tau$$

The two tables included below illustrate the application of the equation for pings at a variety of different water depths over a medium silt sediment (a k value of 0.4). The first table has a frequency f of 20 kHz; the second, a frequency f of 250 kHz. The speed of sound in water c is assumed to be 1500 m/s and the half-angle $\theta$ to be 4°. The pulse length$\tau$ is assumed to be 0.2 ms. The tables show the contribution from the three terms which are added together in the above equation to give the echo duration. The terms are referred to below as the "depth term" $[(2 \times d/c) \times (sec\ \theta - 1)]$, the "sediment term" $[20/c \times k \times f]$ and the "pulse term" $\tau$.

TABLE 1

Frequency = 20 kHz

| Depth (metres) | Depth term (ms) | Sediment term (ms) | Pulse term (ms) | Total (ms) |
|---|---|---|---|---|
| 5 | 0.016 | 1.667 | 0.200 | 1.883 |
| 10 | 0.033 | 1.667 | 0.200 | 1.900 |
| 50 | 0.163 | 1.667 | 0.200 | 2.030 |
| 100 | 0.326 | 1.667 | 0.200 | 2.193 |
| 200 | 0.651 | 1.667 | 0.200 | 2.518 |

TABLE 2

Frequency = 250 kHz

| Depth (metres) | Depth term (ms) | Sediment term (ms) | Pulse term (ms) | Total (ms) |
|---|---|---|---|---|
| 5 | 0.016 | 0.133 | 0.200 | 0.349 |
| 10 | 0.033 | 0.133 | 0.200 | 0.366 |
| 50 | 0.163 | 0.133 | 0.200 | 0.496 |
| 100 | 0.326 | 0.133 | 0.200 | 0.659 |
| 200 | 0.651 | 0.133 | 0.200 | 0.984 |

The examples of Tables 1 and 2 demonstrate that the echo duration is generally not proportional to depth. The domination of the echo duration by the depth term only occurs in the limit of deep water at high frequency. Under any other conditions, the effects of sediment penetration and pulse duration are considerable and in many cases dominate the depth term.

As described above, each ping time series is resampled at a rate calculated so that a standard echo would produce a convenient number, typically 100, of amplitude values. To ensure that very long echoes are not inadvertently truncated, the resampling is continued to produce a fixed number, typically 256, of amplitude values.

The resampling frequency V is calculated as:

$$V = 100/[[(2 \times d/c) \times (sec\ \theta - 1)] + (20/(c \times k \times f)) + \tau]$$

The ping time series is resampled at the frequency V using standard interpolation techniques where necessary and 256 samples are retained for each ping (the "resampled echo").

A set of features, (collectively referred to as a "feature vector") is calculated for each sampled echo. The features used are measures of the shape and spectral character of the echo, namely measures of the fraction of the echo that has happened by various time intervals and measures of the power spectrum as computed by Fast Fourier Transforms and other techniques well known in the industry.

A principal components analysis derives a matrix of factors from the feature vectors of all survey points. This is square with as many rows and columns as there are features. Each column holds a vector of factors which can be applied as a weighted sum to a feature vector to produce a single number, a "component". When a feature vector is applied as an inner product with the entire matrix of factors, the result is a revised feature vector transformed to a new basis (representing linear combinations of the original features). There are many possible choices for such a matrix of factors. Of particular utility is the choice where the matrix of factors is chosen to optimize the ability of a small number of the components to accurately represent the feature vectors—a principal components analysis.

The principal component analysis is conventional and follows the accepted methodology described in any standard statistical reference (for example: "Multivariate statistical methods: a primer" B. F. Manly, Chapman and Hall, 1994)

To reduce the dimensionality of the task of searching for clusters, only the first three of the components calculated in the principal components analysis are used. These are usually referred to as Q1, Q2 and Q3 and typically explain more than 90 percent of the variability in the features. They can be conveniently displayed as a graph in three dimensions.

The cluster analysis determines a relatively small number (usually between 5 and 10) of clusters which are identified by the coordinates of their centroids as measured in the space spanned by {Q1, Q2, Q3}. Each survey point, as represented by its Q1, Q2 and Q3 values is assigned by the technique to a cluster based on all the points in Q-space. A confidence value can be derived from the distance to the closest cluster and to other clusters and by comparison to the cluster covariance in that direction.

Cluster analysis is a well-known technique and more detail of the theoretical basis for the computations described herein may be found in "Numerical Ecology", P. Legendre and L. Legendre, second English edition, Elsevier Science BV, 1998.

Figure 4:
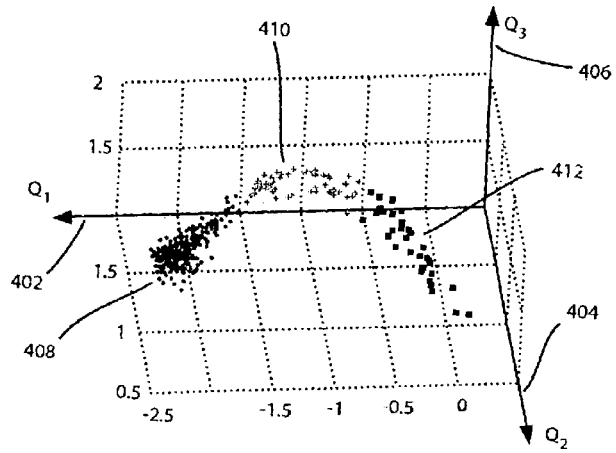
FIG. 4 shows a plot of the location of the feature vector of each survey point in the three dimensional Q-space.
Figure 5:
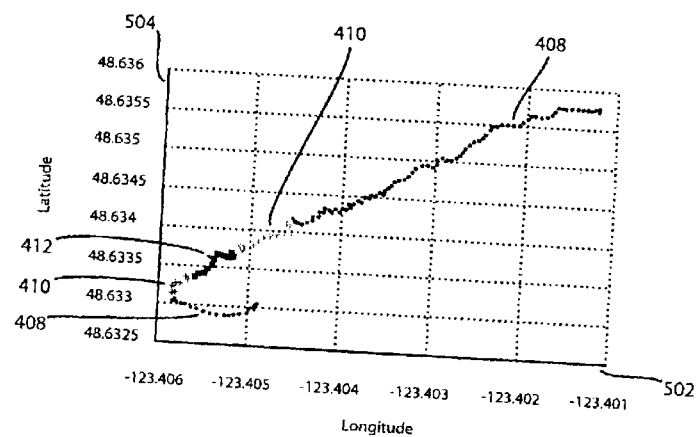
FIG. 5 shows a graph of the course of the survey vessel against latitude and longitude with individual survey points having symbols to indicate their cluster assignments.
Figure 6:
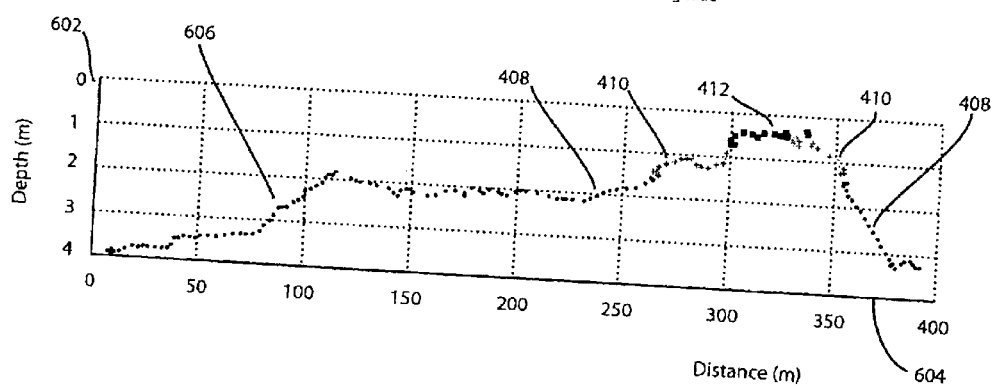
FIG. 6 shows a cross-section through the seabed along the course of the survey vessel as a graph of depth against distance with individual survey points having symbols to indicate their cluster assignments.

By way of example, FIGS. 4, 5 and 6 show the results of a survey. FIG. 4 shows the location of each survey point according to the location of its Q-vector in the three dimensional space spanned by the most significant components from the principal components analysis (the "Q-space"). The axes 402, 404 and 406 correspond to Q1, Q2 and Q3. The Q-vectors have been clustered and the values falling in each cluster are each shown with a different symbol (a circle 408, a cross 410 and a square 412). FIG. 5 shows the course of the survey vessel over the seabed, plotted against longitude 502 and latitude 504. Each survey point is shown along the vessel's course at the coordinates obtained from a Global Positioning System with the appropriate symbol corresponding to one of the clusters of FIG. 4 (408, 410 and 412). FIG. 6 shows a cross-section through the survey area along the vessel's course. The profile of the seabed 606 is plotted as depth to the seabed 602 against distance along the course 604. The points making up the line again correspond to the Q-space cluster for each survey point along the course.

The data displayed in FIG. 5 are associated with portions of the seabed classified according to their acoustic properties. However, in order to make the seabed classification useful as a description of conditions on the seabed, each cluster must be related to the actual conditions on the seabed. This is done by selecting suitable points on a map of the seabed representative of each cluster and returning with a survey vessel either to view actual conditions on the seabed (with a camera) or to bring sediments to the surface (with a "grab").

The final result of the computer program's operation are records stored in a dataset on a computer-readable medium. The records are provided in an ordinary tabular format (".DAT") within an ASCII text file, readily usable by a variety of other off-the-shelf software applications.

FIG. 7A shows experimental measurements of echo durations from two types of seabed. The points marked with a cross 702 are experimental observations taken from a seabed covered with a gravel sediment. A line of best fit is shown as 704. Similarly, a set of experimental observations, marked as circles 706, with a best fit line 708 are shown for a mud sediment. (In FIGS. 7A, 7B and 7C, the abscissa is the depth in meters; the ordinate is the duration of the echo in ms.) These data illustrate not only the linear dependence of echo duration on depth but also that, at very shallow depths, the echo has a constant portion attributable to the duration of the original transmitted pulse and its subsequent penetration into the sediment.

Sediment classification, as generally described herein, makes use of over 100 features to represent the shape and duration of the echo. Many of these depend strongly on the echo duration. In order to provide a simple demonstration of the effectiveness of the invention, the following example focuses on only one feature, namely the echo duration itself. Let us assume that a much-simplified classification scheme operates by assigning an observation into the gravel class if its echo lasts longer than some criterion, the mud class if its echo is shorter.

First, consider classification without compensation, FIG. 7B. A suitable criterion is the mean echo duration at the average depth of the survey, which is shown as a dashed line 726 at 4.2 ms. Echo durations for gravel and mud, calculated from the best-fit lines of the experimental data (704 and 708), are also shown. Both of these lines are plotted thick where the classification would be correct. That is, the portions 722 and 732 are classified correctly; the portions 724 and 730, incorrectly. Without compensation, both gravel and mud echoes are both correctly classified over a common central region of approximately 19 m.

FIG. 7C demonstrates compensation using a proportional technique, as has been commonly used in the prior art. A resampling process is used that is equivalent to multiplying all the echo durations by a factor $d/d_{ref}$ where d is the depth for that echo and $d_{ref}$ is a reference depth, usually the mean depth in the survey area. The compensated values for gravel and mud are shown as graph lines, 740 and 742. The criterion depth for classification 726 stays the same, 4.2 ms, because the factor is one if the echo is from the mean depth. With this compensation method, gravel echoes from any depth 740 and a portion of the echoes from mud 746 are correctly classified. However, mud echoes from shallower than 28 m (thin line, 744) are misclassified. Significantly, the region in which both classifications are correct has grown from 19 to 82 m.

Finally, FIG. 7D illustrates compensation using the compensation and resampling technique described herein. This resampling process, which allows for the constant portions described above, is equivalent to dividing each echo duration by a factor a+(m×d), where m is the average slope of one of the lines in FIG. 7A (either 704 or 708), a is the respective intercept on the y axis, and d the depth to the seabed. (This divisor has units of time, so the quotient is dimensionless.) Following this compensation, the lines 760 and 764 both provide correct classifications to either gravel or mud over the entire depth range.

Although the invention is described herein as a method, the invention may be embodied in a number of other forms, including:

a computer-implemented process;

apparatus for practicing the disclosed method;

as computer program code containing instructions, embodied in tangible media (such as floppy diskettes, CD-ROMs, hard drives, or any other computer-readable storage medium) or transmitted over some transmission medium (such as electrical wiring, cabling, fiber optics, or via electromagnetic radiation) so that when the computer program code is loaded into and executed by a computer, the computer becomes an apparatus for practicing the invention.

Note that while the invention has been described with particular reference to a system and methodology associated with sediment classification, and that the description has focused on a single beam sounder, those skilled in the technology will recognize that variants and modifications can readily be made for other purposes.

I claim:

1. A method for classifying a survey area according to an attribute comprising the steps of:

(a) repeatedly transmitting sonar pings of a uniform duration and known frequency from an echo sounder located at a reference origin on a survey vessel towards the survey area;

(b) measuring the amplitudes of echoes received at the reference origin, each echo comprising sound scattered back from an insonified footprint within the survey area, said insonified footprint being associated with a survey point having a known position measured from the reference origin;

(c) calculating the depth to each survey point from the reference origin;

(d) forming a time series for each echo as a selected number of amplitude values sampled from the echo at a frequency determined as a function of the depth to the survey point for each said echo, said number being selected so that the likelihood of an echo enduring longer than said number of samples is small;

(e) assigning a value for the attribute at each survey point based on the time series sampled from the echo scattered back from the insonified footprint associated with each said survey point.

2. The method of claim 1 wherein the attribute is the type of sediment covering the surface of the survey area.

3. The method of claim 2 wherein the sampling frequency is determined as a selected function of the depth to the survey point of each said echo, a penetration distance representative generally of sediments in the survey area and the duration of the sonar ping.

4. The method of claim 3 wherein the sampling frequency is determined as N/L, L being the duration of a standard echo expected from a ping of duration τ travelling vertically a depth d to a flat portion of the survey area such that sound is scattered back from an insonified footprint subtending an angle of 2θ at the reference origin, said ping penetrating a distance p into sediment laying on the seabed; c being the speed of sound in water; N being a number selected so that the sampling of the standard echo for said depth at said sampling frequency produces N samples; and L is calculated as:

$$L=[(2 \times d/c) \times (sec\ \theta-1)]+(2 \times p/c)+\tau$$

5. The method of claim 4 wherein p is the penetration distance of a ping through sediment generally representative of the survey area, causing the attenuation of the ping's intensity by a selected amount.

6. The method of claim 5 wherein the selected amount of attenuation is 20 dB.

7. The method of any of claims 1 to 6 wherein the number of amplitude values selected is 256.

8. The method of claim 4, 5 or 6 wherein N is 100.

9. The method of claim 1 wherein step (e) comprises the sub-steps:

(e1) calculating at each survey point, a vector of features, each feature being calculated as a selected function of the echo time series associated with that survey point;

(e2) calculating a matrix of factors whereby the inner product of the matrix of factors with any one of the feature vectors produces a Q-vector which is representative of the acoustic nature of the survey point;

(e3) identifying the centroids of one or more clusters as points in the space of Q-vectors and assigning each survey point according to its Q-vector to a cluster; and (f) associating each cluster with a distinct value of the attribute by empirical examination of said attribute at representative survey points in the survey area.

10. A system for classifying a survey area according to an attribute comprising:

(a) a transmitter for repeatedly transmitting sonar pings of a uniform duration and known frequency from an echo sounder located at a reference origin on a survey vessel towards the survey area;

(b) a detector for measuring the amplitudes of echoes received at the reference origin, each echo comprising sound scattered back from an insonified footprint within the survey area, said insonified footprint being associated with a survey point having a known position measured from the reference origin;

(c) means for calculating the depth to each survey point from the reference origin;

(d) means for forming a time series for each echo as a selected number of amplitude values sampled from the echo at a frequency determined as a function of the depth to the survey point for each said echo, said number being selected so that the likelihood of an echo enduring longer than said number of samples is small;

(e) means for assigning a value for the attribute at each survey point based on the time series sampled from the echo scattered back from the insonified footprint associated with each said survey point.

11. The system of claim 10 wherein the attribute is the type of sediment covering the surface of the survey area.

12. The system of claim 11 wherein the sampling frequency is determined as a selected function of the depth to the survey point of each said echo, a penetration distance representative generally of sediments in the survey area and the duration of the sonar ping.

13. The system of claim 12 wherein the sampling frequency is determined as N/L, L being the duration of a standard echo expected from a ping of duration T travelling vertically a depth d to a flat portion of the survey area such that sound is scattered back from an insonified footprint subtending an angle of 2θ at the reference origin, said ping penetrating a distance p into sediment laying on the seabed; c being the speed of sound in water; N being a number selected so that the sampling of the standard echo for said depth at said sampling frequency produces N samples; and L is calculated as:

$$L=[(2 \times d/c) \times (sec\ \theta-1)]+(2 \times p/c)+\tau$$

14. The system of claim 13 wherein p is the penetration distance of a ping through sediment generally representative of the survey area, causing the attenuation of the ping's intensity by a selected amount.

15. The system of claim 14 wherein the selected amount of attenuation is 20 dB.

16. The system of any of claims 10 to 15 wherein the number of amplitude values selected is 256.

17. The system of claim 13, 14 or 15 wherein N is 100.

18. The system of claim 10 wherein the means for assigning a value for the attribute at each survey point comprises:

(e1) means for calculating at each survey point, a vector of features, each feature being calculated as a selected function of the echo time series associated with that survey point;

(e2) means for calculating a matrix of factors whereby the inner product of the matrix of factors with any one of the feature vectors produces a Q-vector which is representative of the acoustic nature of the survey point;

(e3) means for identifying the centroids of one or more clusters as points in the space of Q-vectors and assigning each survey point according to its Q-vector to a cluster; and (f) means for associating each cluster with a distinct value of the attribute by empirical examination of said attribute at representative survey points in the survey area.

* * * * *